United States Patent [19]

Naraghi

[11] Patent Number: 4,880,609
[45] Date of Patent: Nov. 14, 1989

[54] CHELATE CATALYST SYSTEM FOR $H_2S$ REMOVAL FROM A GAS STREAM

[75] Inventor: Ali R. Naraghi, Missouri City, Tex.

[73] Assignee: Champion Chemicals, Inc., Houston, Tex.

[21] Appl. No.: 276,107

[22] Filed: Nov. 23, 1988

[51] Int. Cl.⁴ .......................... C01B 17/16; C01B 3/20
[52] U.S. Cl. .................. 423/226; 423/567 R; 423/576.2; 423/576.6
[58] Field of Search .................. 423/576.2, 576.6, 226, 423/567 R

[56] References Cited

U.S. PATENT DOCUMENTS

| | | | |
|---|---|---|---|
| 4,009,251 | 2/1977 | Meuly | 423/573 G |
| 4,414,817 | 11/1983 | Jernigan | 423/226 |
| 4,515,759 | 5/1985 | Burnes et al. | 423/576.4 X |
| 4,758,416 | 7/1988 | Fong et al. | 423/226 |

*Primary Examiner*—Gregory A. Heller
*Attorney, Agent, or Firm*—Gunn, Lee & Miller

[57] ABSTRACT

The present disclosure is directed to a process in solution for removing $H_2S$ from a stream of natural gas. Sodium nitrite in the solution serves as an oxidizing agent for the $H_2S$. Buffering and defoaming agents are added. Absent a catalyst, the process suffers from conversion of the nitrite ion into $NH_3$ which conversion is suppressed by the incorporation of a transition metal chelate complex. The metal is preferably chromium, copper or iron and the chelate complex is preferably EDTA or TEA, with acceptable performance obtained from HEEDTA or NTA. The metal chelate complex catalyzes the sodium nitrite oxidation of $H_2S$, markedly enhancing sulfur recovery as a precipitate in solution.

19 Claims, No Drawings

CHELATE CATALYST SYSTEM FOR H₂S REMOVAL FROM A GAS STREAM

BACKGROUND OF THE DISCLOSURE

The present disclosure is directed to a process of removal of $H_2S$ from a natural gas stream. In a typical situation, many gathering lines from producing gas wells are brought together, the gas is passed through a compressor and raised to some elevated pressure, and is delivered into a pipeline. Typically, the gathering lines will come together at a collection point in a gas field at which location appropriate compressors and stripping devices are incorporated. These are normally unmanned devices which are serviced only periodically. The present disclosure is directed to a system which can be installed at the gathering location for stripping $H_2S$ from the gas. It is well known that $H_2S$ in natural gas creates a number of problems. It is therefore desirable for the $H_2S$ to be removed from the natural gas. Typically at the compressor location, heavy molecules are stripped from the gas, and any liquids (oil or salt water) that are produced with the gas are also stripped. Also, sand from the wells is also stripped. After stripping, the gas is compressed, raised to some elevated pressure and is delivered into a line from the field for subsequent delivery.

Numerous efforts have been made in the past to provide field installed, typically unmanned $H_2S$ stripping procedures. Three references for this process include U.S. Pat. Nos. 4,008,251, 4,515,759 and U.S. Pat. No. 4,451,442. The '442 reference is directed to $H_2S$ removal by contact with an aqueous solution of a polyvalent metal chelate and oxidizing agent. The metal chelate is reduced to a lower oxidation state, then raised to the higher oxidation state, and is recycled between states to permit reuse. That disclosure sets forth various oxidizing agents and prefers $SO_2$ with alkali metal salts of typical inorganic oxidizers such as chloric, perchloric, hypochlorous and permanganic acids. The chelate utilizes polyvalent metals comprising a rather lengthy list and identifies an even longer list of chelating agents. The '759 reference is directed primarily to water soluble nitrites, the preferred being sodium nitrite. That process is preferably conducted at a pH of 5.5 or greater. The oxidizer of the '759 disclosure, being nitrite, is relatively similar to the list of oxidizers described in the '442 reference. The '251 reference mentioned above discloses treatment of the gas stream in the presence of oxygen bubbled through an aqueous solution, the solution having a water soluble polyvalent metal chelate catalyst which retains the metal in solution, having a pH of about 3 to about 11. The preferred form is the appropriate salt oxide or hydroxide utilizing a alkali metal or $NH_4^+$ salt.

These references come at the matter with some difficulty. Consider for instance, the '251 reference. Ideally, pure oxygen is used as the oxidizing agent. In the field, and especially at remote locations, this would require a source of liquid oxygen which is relatively expensive to keep and maintain at untended locations and which is somewhat more expensive to operate. Moreover, air can be used in place of that but 80% of air is nitrogen which would otherwise be bubbled up through the standing column of water in which the contact process is carried out and would mix with the natural gas stream. Thus, the air injected into the water tower for conducting the process would inevitably dilute the natural gas by adding nitrogen to it. Compression and delivery costs would then be raised because the nitrogen in the natural gas stream might well be transported the full length of the pipeline system and would simply dilute the required btu output of the natural gas stream.

The '442 reference generally relies on the polyvalent state of the metal chelate for recycling. Moreover, it teaches use of $SO_2$ as an oxidizing material. In an example typical of that disclosure, it begins with $Fe^{+3}$ which is reduced to $Fe^{+2}$ and recycled again. The foregoing is carried out for the purpose of converting $H_2S$ to free sulfur and then to various soluble sulfur compounds. As will be understood, the transition from $H_2S$ through the free sulfur state is accomplished in solution: the process mentions the formation of free sulfur but the resultant material is sulfur compounds, not free sulfur. It is suggested that soluble sulfur compounds are less desirable than the free sulfur obtained in the present disclosure. So to speak, the '442 process overruns the goal because the production of water soluble sulfur compounds greatly increases the requirement of needed oxidant over that required to produce elemental sulfur.

The '759 process utilizes sodium nitrite. That is highly inefficient as will be illustrated in the present disclosure. One hypothesis for the inefficiency of that process is derived from a discussion of that process involving one of the inventor's thereof which was published in the *Oil & Gas Journal* on Oct. 20, 1986 at Page 44. In analysis of the process, the $H_2S$ in solution with $NO_2^-$ certainly yields some sulfur, but it also yields $NH_3$. Because of the kinetics of the reaction in solution, there appears to be competing and preferential activity from $NH_3$. The $NH_3$, apparently sustained in solution indefinitely so long as the process is carried out, limits the effectiveness of the less active $NO_2^-$, thereby reducing the relative efficiency of that process. As will be detailed in the present disclosure, marked advances in process efficiency per unit weight of oxidizer have been shown, and moreover, they are accomplished apparently with the suppression of $NH_3$ formation so that more of the bound nitrogen stays in the form of $NO_2^-$ and process efficiency is remarkably higher. More will be noted concerning this on a review of the detailed description of the preferred embodiment.

DETAILED DESCRIPTION OF THE PREFERRED EMBODIMENT

The present disclosure is directed to a water soluble alkali metal oxidizer which is used in an aqueous solution for removal of $H_2S$ from natural gas. Natural gas typically includes $CH_4$ and heavier alkanes, e.g., up to $C_4$ series molecules. It may be recovered also with some $CO_2$ present, a factor which sometimes changes the pH of the solution. Be that as it may, natural gas is sometimes produced with $H_2S$ which must be removed immediately for a multitude of reasons. For instance, $H_2S$ causes metal embrittlement. It requires special metal alloys in the construction of gathering lines, compression stations and the like to handle natural gas with $H_2S$. The cost of the capital goods is markedly reduced by removing the $H_2S$. $H_2S$ is a significant toxic material. Concentrations even as small as 0.01 ppm can be detected by most people. The gas is toxic in relatively light concentrations. For these reasons and others, it is best removed from natural gas as soon as possible. The natural gas is introduced into an upstanding column filled with water. The water holds in solution the various materials to be described for providing an enhanced H₂S removal process which can be carried out at unmanned equipment typically located in the field near the gathering lines from a number of wells. The present process is typically carried out at above freezing ambient temperatures, typical temperatures being about 4° to about 120° F. It is preferably carried out at normal or elevated pressures within a pressure vessel filled with water. A relatively tall, thin structure can be used; typical dimensions are about 4 feet in diameter with any height appropriate ranging from about 12 feet and up. The sour gas is bubbled up through the column through the aqueous scrubbing solution.

The scrubbing solution in accordance with the present disclosure preferably utilizes an alkali metal nitrite. Sodium or potassium are preferred nitrites. Additional constituents are buffering and defoaming agents. The present disclosure particularly focuses on the addition of a chelated metal which acts as a catalyst.

The chelated metal catalyst is a transition metal such as chromium, copper or iron. Other acceptable metals are manganese nickel or vanadium. The chelate is preferably ethylene diamine tetraacetic acid (EDTA), also N-hydroxyethylethylene diamine triacetate acid (NHEDTA), nitrilotriacetic acid (NTA), diethylene tramine penta acetic acid (DEPTA), pyridine, quinoline, triethanolamine (TEA) or other amine chelating agents having no amino hydrogen substituents which form nitrosamines. Other chelating agents for transition metals are carboxylic acids such as citric acid, glycolic acid, gluconic acid, low molecular weight polymers of acrylic acid, and copolymers of acrylic acid with other water soluble monomers such as acrylamide and/or hydroxyethyl acrylate.

The preferred aqueous solution includes sodium nitrite with a buffering agent, a typical choice being sodium bicarbonate, sodium borate or disodium phosphate. The presence of a buffering agent maintains the solution at a pH of at least 7.0 – 8.5. A typical defoaming agent is dimethyl polysiloxane. The aqueous scrubbing solution can be treated selectively with NaOH to adjust the pH as will be described.

TEST PROCEDURE

A suitable test procedure involves placing about 700 ml of a scrubbing solution in a graduated glass cylinder having a capacity of 1000 ml. A sparge tube was placed in the cylinder introducing gas about ½ inch from the bottom of the cylinder to bubble up through the scrubbing solution. The procedure is carried out at ambient or room temperature and ambient pressure. H₂S was introduced through the sparging tube at a rate of 400 cc per minute for one hour. After one hour, the spent scrubbing solution was placed under a laboratory hood and was left undisturbed for five hours. A clean filter element was weighed whereupon the spent solution was filtered by pouring through the filter element to remove elemental sulfur. The precipitate from the first filtration was then reslurried in 15% HCl to remove acid soluble metal salts and organic contaminants. The remaining sulfur precipitate was then filtered, washed on the filter with distilled water, dried for three hours in a vacuum oven to give the amount of elemental sulfur recovered. This procedure was used in the several tests described below.

TEST 1

527 grams of tap water was placed in a container and 346 grams of sodium nitrite was placed therein. In addition, 4.6 grams of the buffering agent was added along with 4.5 grams of the defoaming agent mentioned above. Also, 9.1 grams of NaOH was added. The foregoing was mixed at room temperature to form a true solution. The process was then begun, bubbling H₂S through the scrubbing solution. While the test contents began initially as a true solution, the solution soon became cloudy, showing a slurry of precipitated sulfur. Total sulfur recovery after one hour was 5.27 grams. Note that the foregoing test did not include a catalyst.

TEST 2

The mixture of Test 1 was again made in solution except the NaOH was omitted and 30.9 grams of catalyst was added. In this instance, the catalyst was the copper complex of triethanolamine (TEA). The molar ratio of NaNO₂ to copper was 161 to 1. On proceeding with exactly the same steps, the total sulfur recovery was 15.97 grams or approximately three fold greater than the test 1 recovery.

TEST 3

Again the same scrubbing solution as in Test 1 was mixed except the NaOH was omitted and 18.2 grams of catalyst was added. In this particular occasion the catalyst was the iron complex of hydroxyethylethylenediaminetriacelicacid chelate (HeedtA). The molar ratio of NaNO₂ to iron was 325 to 1. Promptly upon introduction of H₂S, precipitate was formed. After the same one hour interval, the total sulfur recovery was 13.35 grams of sulfur. This process, as verified by the control of Test 1, shows Test 2 and Test 3 the assistance of a polyvalent metallic ion chelate complex for H₂S oxidation to sulfur.

In this procedure the sodium nitrite serves as the oxidizer while the chelated metal acts primarily as a catalyst and is not chemically altered by the oxidation process.

It is suggested that the '251 reference utilizes sodium nitrite to inhibit oxidation of elemental sulfur to various oxides of sulfur, $SO_x$. In that sense, the sodium nitrite is an inhibitor for the catalytic reaction. There, the chelated metal typically iron, serves as the oxidizer.

TEST 4

The same scrubbing solution as in Test 2 was mixed except chelated copper was omitted and CUSO₄ was added. After using the same method and conditions of Test 2, the total sulfur recovery was 4.5 grams. The molar ratio of NaNO₂ to copper was 161 to 1.

TEST 5

The reaction was carried out using the same scrubbing solution as in Test 3 except the chelated iron was omitted and FeCl₃.6H₂O was added. The total sulfur recovered was 5.47 grams. The molar ratio of NaNO₂ to iron was 161 to 1.

ADDITIONAL TESTS

The test procedure set forth above was repeated using several different combinations of catalysts and metals therewith. These are recorded below in tabular form.

| TEST NUMBER | CHELATED METAL | | GRAMS OF SULFUR RECOVERED |
| --- | --- | --- | --- |
| 6 | Fe | EDTA | 11.43 |
| 7 | Cu | EDTA | 12.92 |
| 8 | Ni | EDTA | 6.3 |
| 9 | Mn | EDTA | 4.07 |
| 10 | Cr | EDTA | 29.875 |
| 11 | V | EDTA | 12.00 |

The molar ratio of $NaNO_2$ to metal was 161 to 1 in all the above tests.

ANALYSIS OF THE DATA

The foregoing suggests that the most desirable catalyst system is Cr EDTA. Recall that the effect of the catalyst is to suppress formation of $SO_x$ and $NH_3$. To the extent that ammonia is generated in this system, nitrite is consumed according to the following reaction:

$$NO_2^- + NH_4^+ \rightarrow N_2 + 2H_2O + \text{heat}$$

Here, the $NaNO_2$ is consumed as the oxidizing agent while the chelate complex serves as the catalyst. Further analysis of the data shows that additional acceptable metal and chelate combinations are iron, chromium and copper preferably with EDTA or TEA which appears to prevent the $NO_2^-$ reaction with $NH_4^+$ so that the benefits of the present disclosure are best realized in this mode of operation. One result is that the $NaNO_2$ is consumed as the oxidizing agent and is not a catalyst in the conversion. The chelate complex serves as the catalyst. Further analysis of the data shows that additional acceptable metal and chelate combinations are iron and copper preferably with EDTA or TEA.

In the preferred reaction, the pH is ideally maintained at 7.0 or above, the preferred range being 7.0 to 11.0. The temperature is preferably maintained at room temperatures. Often, the present process will be installed outdoors, exposed to inclement weather, and may be subject to freezing. In that instance, a heater for the water solution is necessary to maintain the temperature typically in the range of about 40° to about 120° F. Generally, the sulfur treating solution is delivered in concentrated form as a liquid, is mixed with additional water and fills the upstanding column so that treatment can proceed indefinitely until depletion of the fixed quantity of treating solution. There is no precise point at which the treating solution becomes ineffective. This is a function of both gas flow and initial $H_2S$ content of the gas stream. The determining factor in process effectiveness is the consistent reduction of HS content to a selected minimum, typically in the range of about 4 to 5 ppm. In the process, sulfur accumulates as a precipitate at the bottom of the container. It forms a sediment, but due to the addition of the defoaming agent, and other surfactants in the solution, the sediment will generally remain suspended in the column and form on a loose, uncaked sediment or sludge, near the bottom. Ideally, the column is periodically drained from the bottom to drain out the sediment which is primarily particulate sulfur. When drained and upon removal, the material so recovered can then be disposed of by conventional landfill techniques because it is appropriately non-toxic for this method of disposal. Alternatively, the sediment can be dried and particulate sulfur recovered which has appropriate uses well known in fields such as agriculture, etc.

The column of water is periodically recharged by adding the ingredients described herein in the approximate ratios given. On a weight basis, sodium nitrite is mixed with the chelate in ratios ranging from 50:1 up to about 350:1. Buffering and defoaming agents are added in trace quantities, typically in the range of about one unit of such agents to about 50-150 units of sodium nitrite.

In use, the present sulfur removal process depletes the nitrite but generally does not deplete the catalyst. Of course, some portion of the catalyst may be physically lost out of this solution, but it is not depleted. For that reason, after the sulfur removal system is initiated in a column of water, and after depletion of the nitrite, a portion of the sulfur precipitate can be drained from the bottom of the container. A substantial portion of the metal chelate will remain in solution. Only a portion will be lost in the drainage, and even that portion is minimal. Recharging of the vessel thus requires the addition of sodium nitrite along with the buffering and defoaming agents. To the extent that the catalyst is lost by removal of the sulfur precipitate from the bottom of the vessel, then that portion of the metal chelate catalyst must be replaced. It is however, a loss from handling of the solution, and has nothing to do with the catalyzed oxidation process involving the $NO_2^-$. The economics of smaller treatment systems often dictates a total removal of spent fluids and replacement with fresh solution. Sulfur handing at the time of disposition is enhanced by adding a trace amount of a sulfur dispersing agent to keep the sulfur particles in colloidal suspension longer. The amount should be sufficient to be effective. As the bottom of the vessel is periodically drained, the dispersing agent should be renewed along with the sodium nitrite recharged into the vessel.

The foregoing is directed to the preferred procedure of the present disclosure, but the scope is determined by the claims which follow.

What is claimed is:

1. A method for removing $H_2S$ from a natural gas flow having $H_2S$ mixed therein, the method comprising:
    (a) delivering the natural gas flow into an upstanding vessel with an aqueous solution therein for contact with an effective amount of sodium nitrite for oxidation of the $H_2S$ wherein the solution includes a transition metal chelate therein for catalyzing the oxidation of $H_2S$ wherein the solution pH is in the range of about 7.0 to about 11.0;
    (b) recovering natural gas after bubbling through the aqueous solution to remove the natural gas substantially free of $H_2S$;
    (c) accumulating in loose precipitate form elemental sulfur in the solution and periodically removing the accumulated elemental sulfur precipitate therefrom; and
    (d) periodically recharging the solution with additional sodium nitrite as the nitrite is consumed during oxidation of $H_2S$ to sulfur and the sodium nitrite; catalyst ratio is 10:1 or more.

2. The method of claim 1 wherein the solution has a defoaming agent and a buffering agent added thereto.

3. The method of claim 2 wherein the transition metal chelate is chromium, copper or iron, or mixtures thereof.

4. The method of claim 3 wherein the transition metal is in a chelating complex with EDTA or TEA.

5. The method of claim 1 wherein the sodium nitrite:-catalyst ratio is in the range of about 10:1 to about 50:1.

6. The method of claim 1 including the step of adding dimethyl polysiloxane as a defoaming agent thereto.

7. The method of claim 1 including the step of adding $NaHCO_3$ to the solution as a buffering agent therefore.

8. The method of claim 1 wherein the solution is maintained at a pH of about 7.0 or above.

9. The method of claim 1 wherein the chelating complex included EDTA, TEA, HEEDTA or NTA.

10. A method for removing $H_2S$ from a natural gas flow having $H_2S$ mixed therein, the method comprising:
   (a) delivering the natural gas flow into an upstanding vessel with an aqueous solution therein for contact with an effective amount of sodium nitrite for oxidation of the $H_2S$ wherein the solution includes a transition metal chelate therein for catalyzing the oxidation of $H_2S$ wherein the solution pH is in the range of about 7.0 to about 11.0;
   (b) recovering natural gas after bubbling through the aqueous solution to remove the natural gas from the column substantially free of $H_2S$;
   (c) forming elemental sulfur in the solution after oxidation; and
   (d) periodically recharging the solution in the vessel with additional sodium nitrite as the nitrite is consumed during oxidation of $H_2S$ to sulfur and the sodium nitrite; catalyst ratio is 10:1 or more.

11. The method of claim 10 wherein the solution has a defoaming agent and a buffering agent added thereto.

12. The method of claim 11 wherein the transition metal chelate is chromium, copper or iron, or mixtures thereof.

13. The method of claim 12 wherein the transition metal is in a chelating complex with EDTA or TEA.

14. The method of claim 10 wherein the sodium nitrite:catalyst ratio is in the range of about 10:1 to about 50:1.

15. The method of claim 10 wherein the sodium nitrite catalyst ratio is in the range of about 10:1 to an effective amount of catalyst.

16. The method of claim 10 wherein the chelate is selected from the group of citric acid, glycolic acid, gluconic acid, low molecular weight polymers of acrylic acid, and copolymers of acrylic acid with other water soluble monomers such as acrylamide and/or hydroxyethyl acrylate.

17. The method of claim 10 wherein the step of recharging includes adding a colloidal sulfur dispersing agent.

18. The method of claim 10 including a colloidal sulfur dispersing agent in an effective amount to enable elemental sulfur recovery in a liquid suspension.

19. A method for removing $H_2S$ from a natural gas flow having $H_2S$ mixed therein, the method comprising:
   (a) delivering the natural gas flow into an upstanding vessel having an aqueous solution therein for contact with an effective amount of sodium nitrite and transition metal chelate therein wherein the $H_2S$ is oxidized in the solution;
   (b) recovering natural gas after bubbling through the aqueous solution to remove the natural gas substantially free of $H_2S$;
   (c) accumulating in loose precipitate form elemental sulfur in the solution from the oxidized $H_2S$ and periodically removing the accumulated elemental sulfur precipitate therefrom; and
   (d) periodically recharging the solution with additional sodium nitrite as the nitrite is consumed from oxidation of $H_2S$ to sulfur to enable continued oxidation of $H_2S$ to sulfur.

* * * * *